3,395,080
MICROBIOLOGICAL RESOLUTION OF STEROIDS
George Greenspan, Merion, Pa., and David Hartley, Bishop's Stortford, England, assignors to American Home Products Corporation, New York, N.Y., a corporation of Delaware
No Drawing. Filed Dec. 3, 1965, Ser. No. 511,329
1 Claim. (Cl. 195—51)

This invention relates to compositions of matter classified in the art of chemistry as unsaturated gonanes and to microbiological methods for resolving them.

The invention sought to be patented, in its process aspect, is described as residing in the concept of microbiologically selectively oxidizing the d-enantiamer present in a racemic mixture of dl-13β-ethyl-17β-hydroxygon-4-en-3-one with *Penicillium lilacinum* ATCC 10114.

The manner and process of using the invention will now be generally described so as to enable a person skilled in the art of chemistry to make and use a specific embodiment of the same, as follows:

The process of our invention is illustrated schematically as follows:

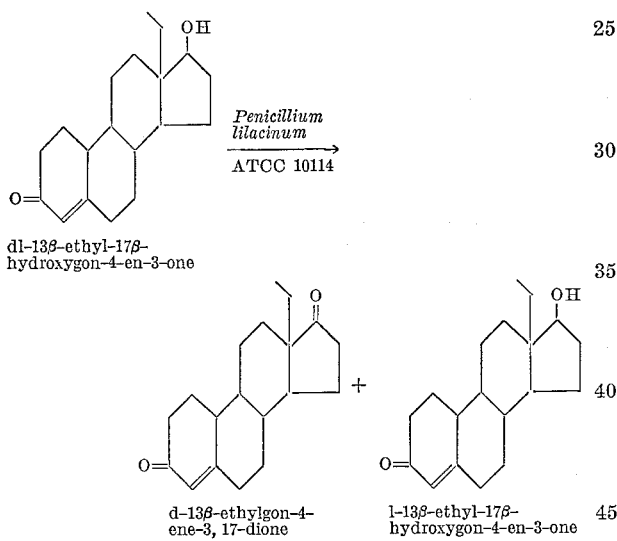

dl-13β-ethyl-17β-hydroxygon-4-en-3-one d-13β-ethylgon-4-ene-3,17-dione l-13β-ethyl-17β-hydroxygon-4-en-3-one The preparation of the racemic mixture, which is the starting material, i.e. dl-13β-ethyl-17β-hydroxygon-4-en-3-one, is described by H. Smith et al., in Experienta 19, 394 (1963) and by the same authors in more detail in J. Chem. Soc. (London), November 1964, p. 4472. The microbiological oxidation is carried out by means of a microorganism of the genus Penicillium, in particular the species *Penicillium lilacinum* ATCC 10114. A growth of said microorganism is prepared in a suitable nutrient medium containing carbohydrate, organic nitrogen and inorganic salts in accordance with procedures known to those skilled in the art. The racemate compound is then dissolved or suspended in a solvent such as methanol, ethanol, or acetone, i.e. water-miscible and non-toxic at the concentrations used, and added to the nutrient medium containing the cultivated microorganism. The culture medium is then shaken and aerated. The nutrient medium employed can be a yeast extract-dextrose medium, casein hydrolysate, corn steep liquor, water extract of soybean oil meal or lactalbumin hydrolysate together with an appropriate carbon source.

The optimum temperature for incubation is in the range of 25–30° C., but the temperature can vary between 20 and 40° C. without adverse effect provided the higher temperatures are not maintained over a long period of time. The time of reaction varies with the size of the culture and the amount of steroid substrate and may be as little as 3 hours or as long as 120 hours, or more.

Recovery of the desired product is accomplished by extraction with a suitable water immiscible solvent followed by filtration, adsorption or other of the commonly used procedures practiced in the steroid art.

The products of the fermentation of the racemate now differing in polarity as a result of a change in chemical structure of the d-form, said form having been selectively oxidized from a 17-ol to a 17-one, can be separated from each other by conventional physical means such as chromatography, fractional crystallization, counter-current distribution, etc. If extraction is used to recover the steroid product, chlorinated lower hydrocarbons, alcohols, or ketones, such as chloroform, methylene chloride, trichloroethane, ethylene chloride, butanol, diethylketone, methyl isobutyl ketone, etc., are suitable.

The d-form of 13β-ethyl-gon-4-ene-3,17-dione is an important and valuable intermediate for making the corresponding d-form of compounds known to have valuable anabolic (13β,17α-diethyl-17β-hydroxygon-4-en-3-one) and female cycle regulating activity (13β-ethyl-17α-ethinyl-17β-hydroxygon-4-en-3-one).

The selective transformation to the 17-ketone of the gonane having an ethyl group at the 13-position is indeed an unexpected result, since, as reported by Prairie, R. L. and Talalay, P., Biochemistry 2, 203 (1963), the action of *P. lilacinum* on the corresponding 13-methyl compound is not specific to the formation of the 17-ketone but continues to form the corresponding D-ring lactone. The further oxidation of the D-ring to a lactone in the process of our invention does not occur, perhaps because of steric effects resulting from the enlargement of the alkyl group at the 13-position.

The following examples illustrate the best mode for carrying out the process of our invention:

Example 1

Primary Inoculum.—Inoculate a 250 ml. Erlenmeyer flask containing 100 ml. sterile medium (dextrose 1%, BBL yeast extract 1%) with 4 ml. of a suspension made by adding 10 ml. sterile water to a salts-nitrate-dextrin agar slant of *Penicillium lilacinum* ATCC 10114 and suspending the spores. Incubate these flasks on a Model G-25 New Brunswick rotary shaker at 25° C., 280 r.p.m. for 24 hours.

Secondary Inoculum.—Inoculate a 4-liter aspirator bottle containing two liters of sterile medium (dextrose 1%, BBL yeast extract 1%) with the above 24-hour primary inoculum. Incubate the inoculated bottle for 48 hours at 25° C. with agitation by a stirring bar. Aerate by an open-tube sparger with 1 liter per min. of air sterilized through a glass-wool filter.

Inoculate a New Brunswick Fermacell-130 containing 90 liters of medium (cerelose 1%, BBL yeast extract 1%) (sterilized 30 minutes at 121° C. and cooled to 25° C.) with the above secondary inoculum. Agitate at 200 r.p.m. by means of turbine impeller. Add sterile air through a ring sparger at 10 liters per minute. Continue operation for 48 hours at 25° C.

After the Fermacell-130 has run 48 hours, filter the beer on a 30-inch Buchner filter under vacuum, through E & D #617 filter paper, having added a small quantity of Solka-floc as a filter aid. Wash the cake copiously with water and resuspend the cake in 90 liters of tap water by returning it to the Fermacell-130.

Add 35 grams of dℓ 13β-ethyl-17β-hydroxy-4-en-3-one in 700 ml. methanol to the slurry. Agitate the mixture at 200 r.p.m. with sparged air at 10 liters per minute. Maintain the temperature at 29° C.

Take 10 ml. samples of the slurry at 4–5 hour intervals. Extract the sample with 2 ml. methyl isobutyl ketone (MIBK), centrifuge for 10 minutes at 3,000 r.p.m. Spot 0.1 ml. of the MIBK extract on Whatman #4 chromatographic paper 20 inches long by two inches wide. Wet the strip up to but not including the spot with a solution of 75% methanol-25% formamide. Blot the strip between pieces of filter paper and develop in a descending manner with cyclohexane saturated with formamide for 4 hours. Dry the strips at 100° C. and locate the spots under short-wave U.V., cut out the spots, elute each with 10 ml. 95% ethanol. Read the O.D. in a Beckman DU spectrophotometer at 240 m$\mu$.

When the ratio of the concentration of the starting material to the product is approximately 1.0, stop the reaction by adding chloroform (ca. 41½ hours).

Filter the fermented slurry and wash the cake, first with acetone, and then with chloroform. Combine the filtrates with the filtered broth and extract thoroughly several times with chloroform. Dry the extracts and concentrate to dryness under vacuum to obtain ca. 50 g. of residue.

Dissolve the residue in benzene (80 ml.)-hexane (20 ml.) and adsorb on neutral Woelm alumina (activity III) (200 g.) in a glass column; the column having been prepared by the wet method using hexane-benzene (1:1) as the solvent. Elute with hexane-benzene (1:1)(5 liters), collecting 500 ml. fractions. Further elution with hexane-benzene (2:3) (6 liters) and hexane-benzene (3:7)(11 liters) and removal of the solvents under vacuum gives d-13β-ethylgon-4-ene-3,17-dione, which on trituration with ether yields 9.1 g., M.P. 171–174°.

Elution with hexane-benzene (3:7)(2 liters) and hexane-benzene (1:4)(5 liters) then gives non-crystalline fractions (2.5 g.), shown by paper chromatography to consist of a mixture. Elution with hexane-benzene (1:4)(2 liters), benzene (15 liters), benzene-chloroform (10:1) (2 liters), benzene-chloroform (5:1)(2 liters), benzene-chloroform (1:1)(2 liters), and chloroform (2 liters) gives ℓ-13β-ethyl-17β-hydroxy-gon-4-en-3-one (10.7 g.).

Example 2

Wash the surface growth of *Penicillium lilacinum* ATCC 10114 on two agar slants, each with 5 ml. of distilled water. Transfer the cell suspensions to two 1-liter flasks containing 200 ml. of the following medium:

| | |
|---|---|
| Yeast extract | g-- 10 |
| Dextrose | g-- 10 |
| Distilled water | l-- 1 |

Incubate the flask on a rotary shaker, 250 r.p.m. 2-inch diameter of rotation, 28° C. After 67 hours, transfer 40 ml. of the mycelial growth to each of eight 2-liter flasks containing 400 ml. of the same medium and incubate for an additional 24 hours. Dissolve 1.12 g. dl-13-ethyl-17β-hydroxygon-4-en-3-one in 45 ml. of methanol and add to the culture of *Penicillium lilacinum* to obtain a concentration of 0.35 g. per liter in the incubating medium. Shake the mixture and incubate for 53 hours. Harvest and extract exhaustively with chloroform. Wash the combined extracts with saturated brine, dry over sodium sulfate and evaporate the solvent under vacuum. Dissolve the yellow residue (ca. 0.62 g.) in benzene-hexane (3 to 1 by volume) and adsorb on neutral Woelm alumina (activity III)(30 g.). Prepare the column using hexane-benzene (1:1) and elute with the same solvents (100 ml.) and then hexane-benzene (2:3)(100 ml.). Elute with hexane-benzene (1:4)(400 ml.) to obtain d-13β-ethylgon-4-ene-3,17-dione (0.272 g.), M.P. 170–174° on evaporation of the solvent; recrystallize from ethyl acetate to obtain 0.195 g. M.P. 175–176°, $[\alpha]_D^{23}$+92.9 (C, 1.0 in CHCl$_3$), $\lambda$ maximum at 280 m$\mu$ (15,560). (Found: C, 79.96%; H, 9.25%. C$_{19}$H$_{26}$O$_2$ required C, 79.68%; H, 9.15%.)

Elute further with hexane-benzene (1:4)(200 ml.), benzene (100 ml.) and benzene-ether (9:1)(400 ml.) to obtain ℓ-13β-ethyl-17β-hydroxygon-4-en-3-one (0.242 g.), M.P. 149–155° on evaporation of the solvent. Recrystallize from ethyl acetate to obtain 0.157 g., M.P. 158.5–160°, $[\alpha]_D^{23}$ −52.1° (C, 0.98 in CHCl$_3$).

The subject matter which the applicants regard as their invention is particularly pointed out and distinctly claimed as follows.

We claim:
1. The process for resolving dl-13β-ethyl-17β-hydroxy-gon-4-en-3-one comprising microbiologically selectively oxidizing the d-enantiamer to d-13β-ethylgon-4-ene-3,17-dione in the presence of *Penicillium lilacinum* ATCC 10114.

References Cited

UNITED STATES PATENTS 3,189,528  6/1965  Smith et al. _____ 195—51

ALVIN E. TANENHOLTZ, *Primary Examiner.*